United States Patent [19]
Mandelik et al.

[11] 3,771,261
[45] Nov. 13, 1973

[54] PROCESS FOR MAKING FUEL GAS
[75] Inventors: Bernard G. Mandelik, Princeton; Marvin I. Greene, Somerset, both of N.J.
[73] Assignee: Pullman Incorporated, Chicago, Ill.
[22] Filed: Aug. 16, 1971
[21] Appl. No.: 171,999

[52] U.S. Cl.................. 48/214, 48/197 R, 48/213, 252/373
[51] Int. Cl........................... C01b 2/16, C07c 9/04
[58] Field of Search................. 48/197 R, 213, 214; 423/652 US

[56] References Cited
UNITED STATES PATENTS

| | | | |
|---|---|---|---|
| 3,625,665 | 12/1971 | Thompson | 48/214 |
| 2,759,806 | 8/1956 | Pettyjohn et al. | 48/197 R |
| 3,119,667 | 1/1964 | McMahon | 48/214 UX |
| 3,432,443 | 3/1969 | Davies et al. | 48/214 X |
| 3,385,670 | 5/1968 | Van Hook et al. | 423/652 |
| 3,436,198 | 4/1969 | Baron et al. | 48/214 |
| 3,551,124 | 12/1970 | Iwaki et al. | 48/214 |
| 3,595,805 | 7/1971 | Cohn et al. | 48/214 X |

Primary Examiner—Joseph Scovronek
Attorney—Clarence W. Crady et al.

[57] ABSTRACT

This invention concerns an integrated and internally controlled desulfurization and reforming process for the production of methane-containing gas having a high heating value. The process comprises reforming a major portion of preconditioned desulfurized naphtha feed to methane in a first reformer and subjecting the first reformer effluent to methanation and removal of oxide contaminants to produce a gaseous product containing at least 90 per cent methane while passing a controlled minor portion of the preconditioned desulfurized naphtha to a second reformer wherein under a higher steam to carbon ratio, increased by a ratio of at least 0.5 over the first stage reforming, and under more severe reaction conditions, the naphtha undergoes a shift reaction to maximize the production of hydrogen in the second reformer. The hydrogen-containing effluent from the second reformer is decontaminated by removal of inorganic oxides and the decontaminated essentially oxide of carbon free, hydrogen-rich gas is contacted with fresh feed in a desulfurization zone wherein a mole ratio of hydrogen to sulfur is maintained preferably between about 400:1 and about 850:1 for the catalytic desulfurization of sulfur contaminated naphtha feed. The sulfur contaminants in the naphtha feed are converted to hydrogen sulfide which is scrubbed from the feed to produce a desulfurized naphtha suitable for reforming to methane under comparatively mild conditions.

4 Claims, 1 Drawing Figure

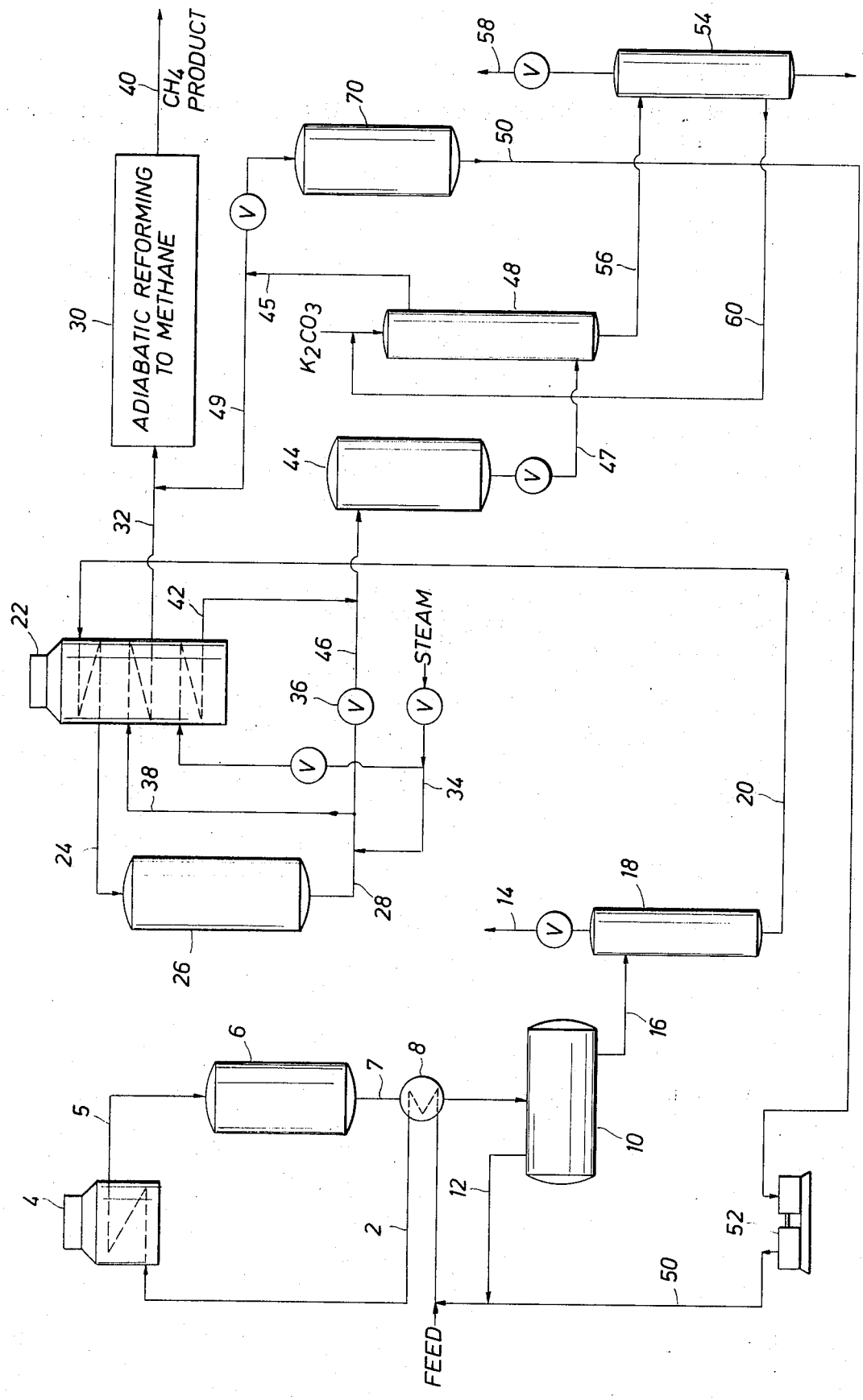

PROCESS FOR MAKING FUEL GAS

The ever increasing use of gas as a fuel for household and industry has necessitated large expenditures in research to provide an economical process for the production of such gas from inexpensive and readily available raw materials which can be used as heating, substitute heating fuels or employed to supplement existing facilities. Such substitution or supplementation is needed to meet peak load requirements. The methane rich gaseous product obtained from reforming which consists predominantly of methane or methane mixed with hydrogen and substantially free of carbon oxides and water is useful as such a high heating value fuel gas and can also be blended for increasing the heating value of town gas which may contain relatively high proportions of carbon dioxide. Additionally, the methane rich gas obtained from reforming has many other technical uses such as an inert gas acting as diluent in various commercial processes. Also, the high hydrogen to carbon ratio of methane makes it useful as a source of hydrogen and as a reducing agent. Still another use for hydrogen methane gaseous mixtures is that of reactant in fuel cells.

Hydrocarbon feeds used in the production of methane gas invariably contain sulfur containing impurities which poison the catalyst during the reforming operation. Therefore, it has proven necessary to desulfurize the hydrocarbon feed as completely as possible before reforming. Since the life of the reforming catalyst, usually a nickel containing catalyst, is directly dependent on the amount of sulfur present in the feed, prior processes have imposed stringent requirements for a sulfur concentration not in excess of 10 ppm and, even at these levels of sulfur contamination, it is found that the nickel containing catalysts lose their activity within undesirably short periods of use.

It is, therefore, an object of the present invention to overcome the deficiencies of prior methods of desulfurization in a commercially and economically feasible manner.

Another object of this invention is to provide a desulfurized hydrocarbon feed to catalytic reforming which contains not more than 7 ppm by weight of sulfur.

Still another object of this invention is to provide a process wherein the means to desulfurize feed to such levels is internally and/or automatically controlled.

Still another object of this invention is to provide a hydrogen-rich stream by adiabatic reforming for control of the temperature profile in the reforming of hydrocarbon liquid to methane.

These and other objects of the present invention will become apparent from the following description and disclosure.

According to this invention a naphtha fraction obtained from any of the various pretreatments of raw petroleum and containing more than 0.01 weight per cent sulfur contaminants in the form of thiophenes, carbonyl sulfide, mercaptans, hydrogen sulfide, inorganic sulfates, etc., is passed to a preconditioning zone wherein it is contacted with hydrogen in a mole ratio of between about 1:25 and about 1:1000 (sulfur to hydrogen) in the presence of a suitable desulfurizing catalyst, such as for example, activated carbon, a mixture of cobalt and molybdenum oxides, iron oxide, or zinc oxide which may be supported on a carrier such as alumina, silica, or any known support material, e.g., zirconia, a balanced cement, etc.

The liquid product from the preconditioning zone is stripped of sulfur contaminant to provide a substantially sulfur free naphtha fraction having a sulfur content not in excess of 7 ppm and preferably not in excess of 0.05 ppm. A major portion of the desulfurized fraction is heated to a temperature of at least 750°F. and not more than 1100°F., preferably a temperature between about 800°F. and about 1000°F. and is subjected to catalytic reforming to methane in the presence of steam added in a mole ratio of between about 1:1 and about 2:1 moles of steam to atom of carbon while a minor portion, less than 12 per cent by volume, of the desulfurized fraction is superheated to a higher temperature of between about 920°F. and about 1250°F. The superheated fraction is then passed to a second catalytic reformer wherein under relatively severe conditions including a pressure of between about 600 psia. and about 1200 psia., preferably between about 750 psia. and about 1100 psia. and a preferred temperature of from about 950°F. to 1150°F., the naphtha feed is converted to a product having a substantially increased hydrogen concentration over that obtained in the first reformer.

A relatively large amount of steam, between about 2:1 and about 12:1 moles of steam per atom of carbon of the hydrocarbon mixture is present in the second reforming stage in order to maintain the hydrogen in the product effluent under a relatively high partial pressure, i.e., between about 300 psia. and about 1000 psia. Thus, the amount of steam added to the second stage of reforming is increased by a ratio of at least 0.5 over the steam to carbon ratio employed in the first reforming stage for the production of methane.

Although any of the known reforming catalysts can be used in this second stage of reforming, it is preferred to employ a catalyst having slightly acidic properties such as nickel and/or cobalt in the form of the elemental metal or metal oxide on a silica support, since such acidic catalysts favor hydrogen formation. Nickel and/or cobalt containing catalysts on zirconia are also preferred for reforming to hydrogen. Under these conditions, the naphtha fraction is converted to a mixture of predominantly hydrogen and methane wherein the hydrogen comprises at least 40 percent by volume of the mixture. The effluent from the second reforming stage is then dried and purified with respect to removal of oxides of carbon at reduced pressure and the purified effluent, sufficient to provide and maintain the hydrogen to sulfur contaminant ratio set forth above, is then passed to the preconditioning zone for desulfurization of the incoming feed in the presence of the desulfurization catalyst. The required amount of the purified effluent from the second reformer can be premixed with the incoming feed prior to heating to reaction temperature or can be introduced directly into the desulfurization zone. In either case, the hydrogen-rich effluent must be recompressed prior to contact with feed since the purification treatment is generally carried out at a pressure less than 700 psia. and the desulfurization is effected at a pressure between about 750 psia. and 1000 psia.

The amount of desulfurized naphtha passed to the second reforming stage can be automatically controlled by means of a sensing device which is responsive to the sulfur concentration in the feed and is adapted to regulate the flow of naphtha to the second reformer. However, an excess of the amount required for desulfurization is usually passed to the second stage of reforming. This excess of hydrogen-rich gas produced in the second reforming stage is passed to the first reforming stage to initiate the exothermic reaction in the first reforming stage. Such production and use of excess hydrogen is particularly preferred when operating the first stage reformer under adiabatic conditions to produce methane.

One of the major advantages of the present process is the direct utilization of desulfurized naphtha feed to the second stage reforming. In this way, the high levels of steam and hydrogen, normally required to prevent carbon deposition in the stage wherein liquid hydrocarbon is reformed to methane, can be obviated. Since only the catalyst treating the minor amount of feed subjected to relatively severe reaction conditions in the second reformer must be protected against carbon deposition by a relatively high steam to carbon ratio, the amount of steam required in the overall process is markedly reduced. In this way sufficient hydrogen can be produced in the second reformer to satisfy the hydrogen requirement in the first reformer. It is desirable to avoid the use of any part of the naphtha which has been subjected to the first stage of reforming or which is partially reformed between zones of reforming to methane as feed to the second reforming stage. The use of such feed for the production of hydrogen required for desulfurization adds considerably to the cost of the overall process for the reason that instead of compressing desulfurized liquid hydrocarbon, a gas compressor for the partially disassociated reformed hydrocarbon mixture must be employed. Also, since it is important that the hydrogen be introduced into the first reformer at a point where the feed initially contacts the catalyst, the pressure drop after partial reforming to methane and passage through the second reformer makes it necessary to recompress the hydrogen-rich effluent introduced with feed into the first reformer. Finally, direct reforming under severe conditions where liquid hydrocarbon initially contacts the catalyst provides higher conversion to hydrogen, e.g., at least 40 volume per cent, preferably between about 60 and about 80 volume per cent hydrogen as compared with feed to the first reformer which has undergone partial reforming under relatively mild conditions.

The first reformer, to which a major portion of the desulfurized naphtha fraction is passed, may be operated under adiabatic or isothermal conditions according to various known processes. Although a total steam to carbon mole ratio of between about 1:1 and about 2:1 is generally employed for the first reforming stage of the present invention, a ratio of between about 1.3:1 and about 1.6:1 is preferred. Also, according to the integrated process of this invention, the first reforming stage is carried out under relatively mild conditions as compared to the second reforming stage. For example, a temperature of between about 800°F. and about 1080°F. and a pressure of from 400 to about 800 psia. is considered adequate to convert the major portion of the desulfurized naphtha fraction to methane product. It is to be understood that the first reforming stage can comprise one or a plurality of zones and that, while adiabatic operation is preferred, temperature in the first stage may be controlled with efficient utilization of heat exchange between the endothermic and exothermic reactions taking place in this stage. Positive cooling by indirect heat exchange with coolants can also be employed to maintain a relatively constant temperature in the primary reforming stage, if desired.

Within the first or primary reformer, the initial reaction which takes place is illustrated by the equation $$C_xH_y + XH_2O \rightarrow XCO + (X + Y/2)H_2$$

This endothermic reaction gives way to the exothermic methane forming reaction illustrated by the following equation $$CO + 3H_2 \rightarrow CH_4 + H_2O$$

Although it is to be understood that the reactions overlap and take place simultaneously, the second equation is the predominant reaction which takes place at the end of the primary reforming operation.

Although the primary reforming stage can be performed in one or two stages with or without heat control, e.g., as illustrated by U.S. Pat. No. 3,450,514, in the present process, it is preferred that this stage of reforming be carried out adiabatically in at least three zones, most preferably from four to six zones. In this case steam and hydrogen are introduced with feed into the first zone and a minor proportion of steam and/or hydrogen can be added to a subsequent zone or a plurality of subsequent zones, if desired.

The methane rich effluent from the primary reformer is passed to a methanation zone wherein a remaining portion of carbon monoxide and hydrogen is catalytically reacted to produce additional methane in the presence of a methanation catalyst, if desired. Finally, the product may be cooled to a temperature of between about 100°F. and about 500°F., preferably between about 150°F. and about 450°F., and treated for the removal of oxides of carbon and water to provide the methane product of the process. When methanation is employed the product gas has a high heating value in the order of about 1000 B.T.U./standard cubic foot.

The methanation catalyst may be the same catalyst as that employed in either or both of the reforming stages, although a catalyst having low acidity such as nickel or cobalt on a silica support, is preferred. A low inlet temperature employed in methanation favors the formation of methane, although some reversion takes place due to the exothermic nature of the reaction. However, by maintaining the temperature of this zone below 800°F., formation of carbon monoxide is negligible. When the temperature is maintained below about 750°F., substantially no carbon monoxide is formed and a gaseous product containing at least 95 volume per cent methane and having a heating value of at least 980 B.T.U. per standard cubic foot is cooled and recovered as the product of the process.

At in the first stage reforming, the catalytic methanation stage may also be carried out in one or a plurality of zones. When a plurality of methanation zones are employed, a portion of the steam can be removed from the mixture after the first stage to reduce the volume of gas undergoing treatment in subsequent stages. In accordance with the reduction in the steam ratio, temperature is also lowered to a range between about 500°F. and about 700°F.

Feeds suitable for the present process include sulfur-containing hydrocarbon feedstock which comprises a single hydrocarbon or a mixture of hydrocarbons within the average range of from 3 to 15 carbon atoms which mixtures are gaseous or liquid at ordinary temperature and pressures and boil within the range of from about 20°C. to about 600°C. Particularly preferred examples of such hydrocarbons include propane, butane, and paraffins up to and including oils such as naphtha. The liquid or gaseous mixtures are usually termed light distillates which are attained as fractions from the treatment of petroleum. The condensate from wet field gas, solvent extracts, or raffinates are also suitable as feed for the present process. These petroleum derived mixtures contain such an amount of sulfur that, if they were used in a process of steam reforming, the reforming catalyst would soon become poisoned. In prior processes which employ heavily contaminated feeds, a high steam to carbon ratio must be maintained during reforming to protect the catalyst; for example, in the order of from about 6 to about 7 molecules of steam per atom of carbon has been generally used to avoid carbon deposition even though such quantities of steam render catalytic reforming unattractive from the standpoint of economics.

Usual reforming catalysts include nickel as an active catalytic component. The deactivation of the catalyst may be considered as being caused by sintering or oxidation of the nickel at the higher temperature required for reacting the hydrocarbons, particularly reforming, the higher molecular weight hydrocarbons present in fractions boiling between 150°C. and 550°C. Although sulfur is a catalyst poison, when the concentration levels are controlled below 7 ppm it does not interfere with the process but, when the sulfur concentration is in excess of this limit, its presence rapidly lowers catalytic activity by deadening part of the catalyst surface area which indirectly promotes sintering by requiring higher temperature to obtain conversion desired for reforming. It is this deadening effect of the catalyst surface which also requires excessive steam to carbon ratios to avoid blocking due to carbon deposition. On the other hand, a small amount of sulfur in the reformer feedstock is beneficial for the reason that catalyst activity is better controlled and exothermic reaction in the reformer does not result in rapid escalation of temperature in the zone. Thus, it is important to reduce the concentration of sulfur in the reforming feed below certain limits, such as below about 7 parts per million, e.g., usually to not more than 2 to 5 ppm.

The catalysts employed in the stages of reforming and methanation can be any of those employed in previous processes and are usually a nickel oxide supported on alumina, silica, zirconia, magnesia or mixtures thereof including a balanced cement. Some alternatives of catalyst compositions include nickel sepiolite and platinum group metal catalysts, as described, for example, in U.S. Pat. No. 3,379,505 and U.S. Pat. No. 3,481,722.

It is preferred that the reforming catalyst be promoted with alkali or alkaline earth metals in the form of oxides, hydroxides or carbonates such as sodium carbonate, potassium carbonate, sodium hydroxide, magnesium oxide, calcium oxide, lithium oxide, etc. Particularly preferred catalysts are those containing nickel in the form of the elemental metal or metal oxide on a refractory support and containing at least 0.5 weight per cent of added alkaline or alkali metal compound as described in U.S. Pat. No. 3,119,667 and U.S. Pat. No. 3,567,411. Another particularly preferred catalyst for reforming in the present process is the mixture of nickel and cobalt on zirconia as described in copending application Ser. No. 120,971, filed Mar. 4, 1971. Still another particularly preferred catalyst for the present reforming process is the cobalt on zirconia catalyst described in U.S. Pat. No. 3,385,670. These particularly preferred catalysts possess improved resistance to sulfur poisoning together with high catalytic activity which permits maximum conversion to product over long periods of use.

The catalyst employed in the preconditioning or desulfurization zone is usually a mixture of zinc oxide, iron oxide or cobalt and molybdenum oxides or nickel and molybdenum oxides deposited on an inert support, such as silica, kieselguhr and, preferably, alumina; although the individual oxides or activated carbon can be employed as the catalyst, if desired. When desulfurization is carried out in a plurality of stages, combinations of different catalysts or catalyst mixtures provide the best results. For example, the first stage of the preconditioning zone can comprise one or more beds of the cobalt-molybdenum catalyst, whereas the subsequent stage or stages can employ zonc oxide as the catalyst. However, this order of catalytic desulfurization may be reversed, if desired. In the case of multistage pretreatment, the hydrocarbon enriched treating gas of the present invention may be introduced into each stage; although it is preferred that at least 75 volume per cent be introduced into the first stage. Generally, the desulfurization is carried out at a temperature of between about 350°F. and about 950°F. under from 750 to 1100 psia.

A particularly preferred preconditioning treatment comprises passing raw naphtha feed at a temperature of between 700°F. and 850°F. under from 700 to 1100 psia. through two or three beds of cobalt-molybdenum-alumina catalyst in contact with the hydrogen-rich pretreating gas obtained in accordance with this invention wherein the concentration of hydrogen with respect to sulfur in the raw feed is maintained in a mole ratio of between 400:1 and 850:1. The resultant effluent containing unconverted naphtha, hydrogen and methane and, wherein a major portion of the sulfur contaminants have been converted to hydrogen sulfide, is passed to a separation zone to remove a gaseous phase comprising methane and hydrogen from a liquid naphtha phase containing hydrogen sulfide. Hydrogen sulfide is then stripped with steam as a gas from the liquid naphtha together with some of the methane carried over from the initial separation step. The liquid, hydrogen-enriched naphtha can then be contacted with zinc oxide to reduce sulfur contamination to lower concentration, if necessary or desired, before heating to reforming temperatures. The gaseous hydrogen and methane phase removed from the separation zone can be beneficially employed to supplement the purified hydrogen-rich effluent from the secondary reformer which is employed as the pretreating gas in the present process.

Reference is now had to the accompanying drawing which illustrates a preferred embodiment of the steps in combination which comprise the invention in the present process. However, it is to be understood that many variations and modifications with respect to the primary or secondary reforming and methanation can be made in accordance with this disclosure without departing from the scope of the invention.

According to this particular embodiment, about 500,000 pounds per hour of naphtha feed together with about 12,000 pounds per hour of hydrogen-rich gas having the following compositions are introduced by means of line 2 into furnace 4 wherein the temperature of the gas-liquid feed is raised to 750°F.

COMPOSITION OF NAPHTHA FEED

| Components | Weight percent |
|---|---|
| Sulfur contaminants (organic) | 0.005 |
| Sulfur contaminants (inorganic) | 0.005 |
| $C_3$–$C_7$ hydrocarbons | 99.99 |

COMPOSITION OF THE HYDROGEN-RICH GAS

| Components | volume percent |
|---|---|
| Methane | 28.52 |
| Hydrogen | 70.48 |
| Inerts | 1.00 |

The heated feed is then withdrawn from heater 4 and is introduced into desulfurization reactor 6 from line 5. In the desulfurization reactor at a temperature of 750°F. and a pressure of 750° psia., the contaminated feed and hydrogen of the hydrogen-rich gas are reacted in the presence of a bed of catalyst comprising cobalt oxide-molybdenum oxide supported on silica. The mole ratio of sulfur in the feed to hydrogen in the treating gas is maintained at about 1:800 and the residence time of the feed in this zone is about 7 minutes. The hydrogen treated feed is then withdrawn by means of line 7, passed through indirect heat exchanger 8 wherein it is cooled against imcoming feed, and the cooled material is passed at a rate of about 512,000 pounds per hour at a temperature of 105°F. into separation drum 10 wherein liquid is settled for about 5 minutes and the resulting liquid and gas phases are separated. The separated gas phase which comprises hydrogen and methane is removed from the system by means of valved line 12 and is passed to line 50 (hereinafter described).

A liquid hydrogen-enriched, naphtha containing hydrogen sulfide is removed from zone 10 and is passed through line 16 into hydrogen sulfide stripper 18 wherein contaminant hydrogen sulfide is removed by distillation at a temperature of about 420°F. under 200 psia. The distilled hydrogen sulfide gas containing not more than 60 percent methane is vented from the system by means of valved line 14. To insure minimum loss of methane in zone 18, this tower is usually refluxed in a 1:1 ratio.

The substantially desulfurized naphtha containing not more than 5 ppm sulfur is then removed from the distillation zone and is passed into line 20 from which it enters preheat furnace 22. This furnace is separated into several heating zones with the cooler zone at the tip and the hottest zone at the bottom of the furnace. It is to be understood that in the present process, other heating arrangements can be employed. For example, separate furnaces, each controlled to the temperature requirements of the various process streams of the system can be employed.

According to the present embodiment, however, the naphtha from line 20 is passed to the upper portion of unitary furnace 22 where it is heated to about 750°F. The naphtha is then passed through a second desulfurizer 26 from line 24. In the second desulfurizer, a remaining small amount of sulfur contaminant is removed by contact with a fixed bed of zinc oxide catalyst. Usually not more than 7 ppm sulfur remains in the naphtha fraction at this point, and in the present example the zinc oxide absorbs the sulfur contaminant to provide a naphtha fraction having less than 5 ppm sulfur. If desired, the second desulfurizer can be omitted since such small amounts of sulfur do not cause rapid deterioration of the reforming catalyst, particularly catalyst of the more active type such as the catalyst described in U.S. Pat. No. 3,567,411 and U.S. Pat. No. 3,385,670.

In the process shown, the naphtha fraction separated from the second desulfurizer in line 28 is split with the major portion being returned to a lower portion of the furnace where it is heated to about 975°F. before entering adiabatic reforming zone 30 from line 32.

Reforming zone 30 is operated adiabatically under the usual conditions for forming a methane rich gas. More specifically, the temperature of the incoming feed, namely, a temperature within the range of 820°F.–1500°F. is initially decreased in an endothermic reaction resulting in the formation of oxides of carbon, and hydrogen and is subsequently increased in the ensuing exothermic reaction of hydrogen and an oxide of carbon to produce methane so as to maintain an overall uniform temperature profile. The reaction is carried out in the presence of an alkalized nickel reforming catalyst and steam which, in the process of the drawing, is introduced from valved line 34 for admixture with desulfurized naphtha in lines 28 and 38. Generally, the steam to carbon ratio which is maintained in the first reforming zone is between about 1 to about 3 pound moles per pound atom of carbon in the feedstock. The amount of hydrogen, which is also present in the reforming zone, is maintained at a higher level to control the temperature profile, i.e., to initiate the exothermic reaction as near as possible to the entrance to the catalyst bed. Generally, the hydrogen to carbon ratio entering the catalyst bed in zone 30 is between about 0.1 and about 3 pound moles of hydrogen per pound atom of carbon. In zone 30 about 100 per cent conversion of naphtha takes place and the resulting product mixture is withdrawn in line 40 and subsequently treated for purification which includes removal of water and oxide of carbon contaminants. If desired, the reforming effluent from zone 30 after the removal of at least a portion of carbon dioxide can be further enriched by passing the steam containing product mixture into a methanator wherein, at a temperature of about 600°F, a portion of the remaining carbon monoxide and hydrogen are reacted to form methane and to provide an overall conversion to methane product in the process of about 77 per cent. In the present process any convenient method of reforming to methane can be employed and this operation can be carried out in one or a plurality of stages.

Particularly, in accordance with the present invention, 5 volume per cent of the preheated naphtha, either in line 24 or line 28, is monitored through valve 36 into line 46. Steam is introduced into the lowermost portion of preheating furnace 22 wherein it is brought to a temperature of about 1200°F. in line 42 and is mixed with the preheated naphtha fraction from valved line 46 in an amount such that a mole ratio of 6:1 steam to carbon ratio is maintained in the mixture. The naphtha thus preheated to a temperature higher than that required in the first adiabatic reformer is then passed into the secondary reformer 44 which is operated adiabatically and under more severe conditions, i.e., the higher temperature and the higher steam/carbon ratio. In the secondary reforming zone, between about 42 and about 85 per cent conversion to hydrogen takes place. In this particular example, a naphtha conversion of about 55 per cent to hydrogen is obtained. It should be understood that the amount of desulfurized and preheated naphtha, either from line 24 or line 28, is determined by the conversion taken in the second reforming zone and the amount of hydrogen required to maintain a mole ratio of sulfur contaminant to hydrogen between about 1:25 and 1:1000 in desulfurizer 6. Since, in this example, 55 per cent conversion to hydrogen is obtained in the secondary reforming zone and the ratio of sulfur contaminant to hydrogen in zone 6 is about 1:800, only about 5 volume per cent of the total naphtha in lines 24 or 28 is needed for the second adiabatic reformer 44.

An active nickel catalyst of the type used in the first reformer is employed in zone 44. In the present case about 25 weight per cent nickel in the form of oxide is promoted with 3 per cent NaOH on alumina employed in the second reformer. The gaseous effluent is withdrawn from zone 44 at a rate of 215,000 pounds per hour and passed to valved line 47. The composition of the second reformer effluent is as follows:

| Components | Weight percent |
|---|---|
| Hydrogen | 1.54 |
| Methane | 3.67 |
| $H_2O$ | 82.69 |
| Oxides of Carbon | 12.10 |

The hydrogen-containing gas from line 47 is then introduced into carbon dioxide absorber 48.

In absorber 48, the hydrogen-containing gas containing 1.54 weight per cent hydrogen, 3.67 weight per cent methane, 82.69 weight per cent water and 12.1 weight per cent oxides of carbon is contacted at a temperature of 175°F. under 725 psia. with an aqueous 30 per cent solution of potassium carbonate. The potassium carbonate solution absorbs carbon dioxide from the gaseous hydrogen-methane mixture and a substantially carbon dioxide free, hydrogen-methane gaseous mixture containing about 8 weight per cent carbon monoxide is withdrawn from zone 48 by means of line 45. The portion required in zone 6, i.e., 12,000 pounds per hour of the gaseous mixture in line 45 is passed into methanator 70 for conversion of the carbon monoxide to methane. The resulting hydrogen-methane mixture is withdrawn from zone 70 in line 50 for mixture with the raw naphtha feed compression to 775 psia. in compressor 52. In this embodiment, a 90 per cent portion of the gaseous effluent in line 45, which amount is not required as treating gas in zone 6, is introduced via line 49 into reforming zone 30 to lower the steam requirement therein. Usually the process is designed to pass 10 to 30 volume per cent of the decontaminated hydrogen-rich effluent to the desulfurization zone to satisfy the hydrogen requirement therein. The remaining 70 to 90 volume per cent is advantageously passed to the first reforming stage. When the reforming zone 30 is operated in a plurality of steps or stages, the hydrogen gas can be fed between stages; although it is preferred to introduce at least 75 per cent or more into the first stage.

The aqueous potassium carbonate solution containing absorbed oxide of carbon is then introduced into carbon dioxide stripper 54 by means of line 56. In zone 54 at a temperature of 240°F. under 15 psia., about 35 per cent of the oxides of carbon are stripped with steam from the carbonate solution and are subsequently vented to the atmosphere from valved line 58. The remaining aqueous solution can be recycled to zone 48 by recycle lines line 60. In the present example about 100 per cent of the aqueous solution is thus recycled to zone 48.

Other methods of purifying the hydrogen-containing gas in line 47 can be employed, if desired. For example, monoethanol amine or solutions containing copper can be used as the scrubbing liquid to remove carbon dioxide. However, the present scheme of purification is preferred for economic reasons.

In the above process, as shown by the drawing, a cobalt on zirconia catalyst is substituted for the nickel on alumina catalyst in zone 44. In this case, 8 weight per cent cobalt, expressed as cobalt oxide and based on the total weight of cobalt-zirconia, is employed. This catalyst provides a product gas containing about 85 per cent hydrogen and an extended catalyst life over the nickel catalyst. The hydrogen-containing product gas is treated for removal of carbon dioxide as described above and a preferred 80 to 90 volume per cent of the carbon dioxide decontaminated hydrogen-rich gas is introduced into the first stage reforming zone 30 while the remaining portion of the decontaminated hydrogen-rich gas is methanated to remove carbon monoxide. Of the resulting oxide of carbon free, hydrogen-rich gas containing methane, a preferred 10 to 20 volume per cent is repressurized and recycled to desulfurization zone 6. Any remaining decontaminated hydrogen-rich gas containing methane can be recovered as a fuel gas product of the process having a heating valve of about 1000 B.T.U./standard cubic foot.

Other variations and modifications of the present invention will be apparent from the preceding disclosure and are, therefore, within the scope of this invention which comprises passing a small portion of desulfurized feed into a second reformer where it is reformed under relatively severe conditions to maximize the production of hydrogen required for desulfurization of the main naphtha feed stream which is reformed under relatively mild conditions.

Having described our invention, we claim:

1. In a process for steam reforming a sulfur-containing naphtha feed wherein the feed is catalytically desulfurized in a desulfurizing zone to reduce the sulfur content to less than 7 ppm. and is subsequently heated and reformed in a first adiabatic reforming zone in the presence of steam to a gaseous product containing methane, the improvement comprising:
   a. separating less than 12 volume percent of the desulfurized feed to obtain a minor portion;
   b. passing the minor portion to a second adia-batic steam reforming zone;
   c. maintaining a mole ratio of between about 2 to 1 and about 12 to 1 moles of steam to atoms of carbon in the second reforming zone;
   d. catalytically reforming the minor portion in the second reforming zone under severe conditions including a temperature of between about 920°F to about 1250°F and a pressure between about 600 psia. and 1200 psia. to obtain a gaseous product mixture containing hydrogen, water, and carbon oxides;
   e. maintaining the partial pressure of hydrogen in the second reforming zone between about 300 psia. and about 1000 psia;

f. removing water and carbon dioxide from the gaseous product mixture to obtain a hydrogen-rich gas;

g. passing a controlled amount of the hydrogen-rich gas to the desulfurization zone; and h. maintaining a hydrogen to sulfur mole ratio between about 25 to 1 and about 1000 to 1 in the desulfurization zone.

2. The process of claim 1 wherein the ratio of steam moles to atoms of carbon in the first reforming zone is maintained between about 1.3 to 1 and about 1.6 to 1 and the ratio of steam moles to atoms of carbon in the second reforming zone is increased by a factor of 0.5 over the ratio employed in the first reforming zone.

3. The process of claim 1 wherein between about 70 and about 90 volume percent of the hydrogen-rich gas is passed to the first reforming zone, and between about 10 and about 30 volume percent of the hydrogen-rich gas is methanated to remove carbon monoxide and passed to the desulfurization zone.

4. The process of claim 3 wherein the ratio of hydrogen moles to atoms of carbon in the first reforming zone is maintained between about 0.1 to 1 and about 3 to 1.

* * * * *